(12) United States Patent
Schattner et al.

(10) Patent No.: US 6,382,569 B1
(45) Date of Patent: May 7, 2002

(54) LINE HOLDER APPARATUS

(75) Inventors: Robert L. Schattner, Cherry Hill, NJ (US); Joseph Clarke, Hatboro; Kyle A. Jackson, Morrisville, both of PA (US); Robert A. Zera, Somerdale, NJ (US)

(73) Assignee: Graydon Products, Inc., Maple Shade, NY (US)

( * ) Notice: Subject to any disclaimer, the term of this patent is extended or adjusted under 35 U.S.C. 154(b) by 0 days.

(21) Appl. No.: 09/520,824

(22) Filed: Mar. 8, 2000

Related U.S. Application Data

(63) Continuation of application No. 29/116,833, filed on Jan. 12, 2000.

(51) Int. Cl.[7] .................................................. F16L 3/08
(52) U.S. Cl. ................................. 248/74.1; 248/220.41
(58) Field of Search .............................. 248/74.1, 68.1, 248/49, 51, 73, 205.3, 300, 316.2, 220.41; 211/45, 60.1, 59.1, 113, 73; 206/45.14

(56) References Cited

U.S. PATENT DOCUMENTS

| | | | |
|---|---|---|---|
| 466,932 A | * | 1/1892 | Cornell |
| 1,622,632 A | * | 3/1927 | Fahnestock |
| 2,722,317 A | * | 11/1955 | Goodwin |
| 3,363,864 A | * | 1/1968 | Olgreen ..................... 248/68.1 |
| 3,861,015 A | * | 1/1975 | Hooven ........................ 29/755 |
| 4,483,502 A | * | 11/1984 | Fast ....................... 248/222.11 |
| 4,718,627 A | * | 1/1988 | Fast et al. ................. 248/225.1 |
| 4,911,392 A | * | 3/1990 | Fast ......................... 248/220.3 |
| 5,077,646 A | * | 12/1991 | Parsons |
| 5,103,970 A | * | 4/1992 | Nielson et al. ........... 206/45.14 |
| 5,284,259 A | * | 2/1994 | Conway et al. ................ 211/73 |
| 5,346,166 A | * | 9/1994 | Valiulis .................. 248/220.41 |
| 5,405,022 A | * | 4/1995 | Rissley ...................... 211/59.1 |
| 5,553,721 A | * | 9/1996 | Gebka ........................ 211/59.1 |
| 5,743,497 A | * | 4/1998 | Michael ..................... 248/68.1 |
| 5,752,682 A | * | 5/1998 | Anderson ................... 248/68.1 |
| 6,006,929 A | * | 12/1999 | Leonard ...................... 211/113 |
| 6,220,554 B1 | * | 4/2001 | Daoud ........................ 248/74.1 |
| 6,254,041 B1 | * | 7/2001 | Dufourg ....................... 248/65 |

* cited by examiner

*Primary Examiner*—Anita King
(74) *Attorney, Agent, or Firm*—Blank Rome Comisky & McCauley L.L.P.

(57) ABSTRACT

A line holder apparatus includes a base panel member, a first finger and second finger. The base panel member extends along and laterally from a longitudinal axis to define a plane and has an opening extending therethrough. The first finger is connected to the base panel member and extends in a first direction parallel to the longitudinal axis. The second finger is connected to the base panel member and extends in a second direction opposite the first direction. The first and second fingers are operative to move to and between a stowed state and an extended state. In the stowed state, the first and second fingers are disposed in the opening and are generally juxtaposed to one another within the plane. In the extended state, each one of the first and second fingers projects outwardly from the opening at an acute angle relative to the base panel member.

19 Claims, 4 Drawing Sheets

LINE HOLDER APPARATUS

This application is a cont of Ser. No. 29/116,833 filed Jan. 12, 2000.

FIELD OF THE INVENTION

The present invention generally relates to a holder for flexible lines, such as flexible tubing, electrical wires, computer cables and the like.

BACKGROUND OF THE INVENTION

In a hospital/healthcare environment, particularly in critical care or intensive care units, flexible tubing is used to convey fluids into and from a patient. For example, medications may be supplied to the patient via tubes and body fluids may be withdrawn from the patient. In addition, electronic equipment is sometimes used to monitor a patient's condition so that not only are flexible tubes found in a patient's room, but also one or more types of electrical or electronic cables or wires.

Occasionally, such flexible tubing is either tied with cords or taped to the patient's bed or other fixtures or hardware found in the room. However, in such situations, moving the patient to whom the tubing is attached requires untying the cords or removal of the tape before the patient can be moved. Unfastening the tubing from the bed or other fixture also consumes time which might be critical to the patient's wellbeing.

Apart from the hospital setting, many different types of electrical and electronic devices are used in modern households and offices. Some of these electrical or electronic devices are used for work or entertainment purposes while others are used to minimize routine household chores such as cooking and cleaning. Many households today have the latest equipment in home entertainment including computers with associated peripheral equipment and "surround sound" stereo equipment for television, broadcast radio and recorded music. By way of example, a home entertainment system might include a television, an am/fm radio, an amplifier, a video cassette recorder (VCR) and a digital video disk (DVD) player. To achieve high-fidelity "surround sound," these devices typically generate sound through at least four (4) audio speakers. All of these components are connected together by various types of electrical wires such as coaxial cable and insulated twisted copper wire. In most modern office environments as in many home environments, computers are typically connected to a power source and a number of peripheral devices, such as printers, scanners, keyboards, monitors and the like by a number of electrical cords, wires and cables. Usually, the cords, wires and cables in both the office and home environments are concentrated in a small location and, as a result, are easily entangled with one another.

It would, therefore, be highly advantageous to organize the tubing and/or wires in the hospital healthcare environment so that a healthcare professional can easily ascertain one tube or wire from another based upon their organization. Similarly, organization of cords, wires and cables in both the home and office environments is very desirable.

It would also be advantageous to provide a line holder apparatus capable of holding one or more lines at a designated location. It would be advantageous if the line holder apparatus can hold individual ones of multiple lines in an organized manner. It would also be advantageous if the line holder apparatus could simply and easily release any selected line being held thereby.

The term "line" or "lines" as used in the context of the invention disclosed herein is intended to include any tube, tubing, band, rope, cord, cable, wire or other elongated element, flexible or otherwise, that can be advantageously held in the line holder apparatus described herein.

OBJECTS AND SUMMARY OF THE INVENTION

It is an object of the invention to provide a line holder apparatus for holding one or more lines at a designated location.

Another object of the invention is to provide a line holder apparatus that is capable of holding a single line or individual ones of multiple lines in an organized fashion.

Yet another object of the invention is to provide a line holder apparatus that can simply and easily release any selected line being held.

Yet another object of the invention is to provide a line holder apparatus that is simple in construction and inexpensively manufactured.

Accordingly, a line holder apparatus of the invention is hereinafter described. One embodiment of the line holder apparatus of the invention includes a base panel member, a first finger and a second finger. The base panel member is a planar element that extends along and laterally from a longitudinal axis to define a plane and has at least one opening extending therethrough. The first finger is connected to the base panel member and extends in a first direction parallel to the longitudinal axis. The second finger is connected to the base panel member and extends in a second direction opposite the first direction. The first and second fingers are operative to move to and between a stowed state and an extended state. In the stowed state, the first and second fingers are disposed in the opening and are generally juxtaposed adjacent one another within the plane of the base panel member. In the extended state, each one of the first and second fingers projects outwardly from the opening at an acute angle relative to the plane of the base panel member.

Another embodiment of the line holder apparatus of the invention includes the base panel member, a pair of first fingers and one second finger. The pair of first fingers are connected to the base panel member, extend in the first direction and are disposed laterally apart from one with a space therebetween. The second finger is sized to fit in the space between the first fingers. The pair of first fingers and the second finger are operative to move to and between the stowed state and the extended state. In the stowed state, the pair of first fingers and the second finger are disposed in the opening and generally juxtaposed to one another in coplanar relation with the base panel member. In the extended state, each one of the pair of first fingers and the second finger project outwardly from the opening at an acute angle relative to the plane of the base panel member.

Other objects and advantages of the invention will become apparent from the following description of the exemplary embodiments taken in conjunction with the accompanying drawings.

DETAILED DESCRIPTION OF THE EXEMPLARY EMBODIMENTS

A first exemplary embodiment of a line holder apparatus 10 of the invention is illustrated in FIGS. 1–7. The line holder apparatus 10 of the invention includes a base panel member 12, a plurality of first fingers 14a–d and a plurality of second fingers 16a–d. As described in more detail below, a combination of respective ones of the first fingers 14a–d and second fingers 16a–d are used for holding a line 18 drawn in phantom in FIG. 1 as demonstrated by example only using fingers 14b and 16b.

Figure 1:
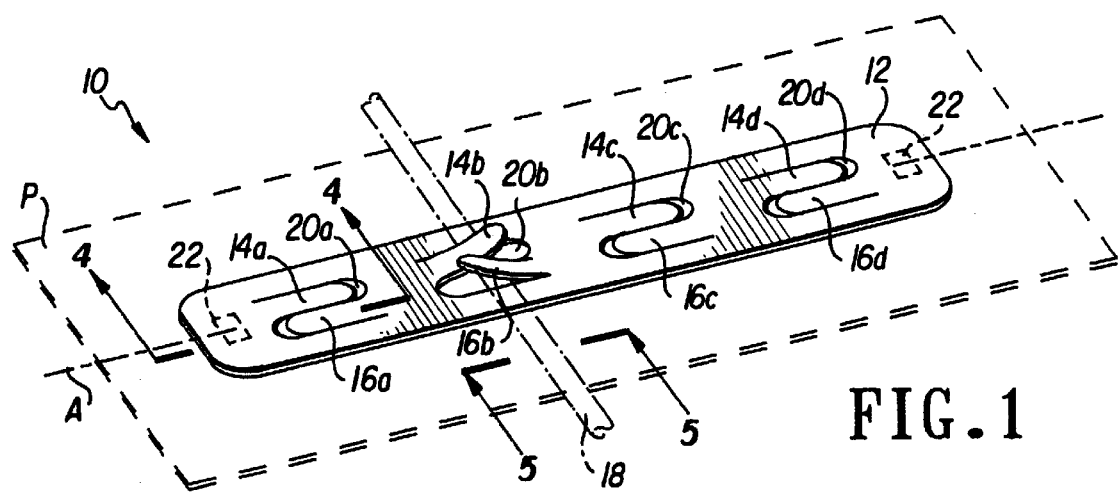
FIG. 1 is a perspective view of a first exemplary embodiment of a line holder apparatus of the invention.

In FIG. 1, the base panel member 12 extends along and laterally from a longitudinal axis A to define a plane P. The base panel member 12 has a plurality of openings 20a–d that extend sequentially along and through the base panel member 12. A respective one of the plurality of openings 20a–d are sized to receive respective ones of the first fingers 14a–d and the second fingers 16a–d. The first fingers 14a–d are connected to the base panel member 12 and the free ends thereof extend in a first direction F shown in FIGS. 2 and 3. The first direction F extends parallel to the longitudinal axis A.

Figure 4:
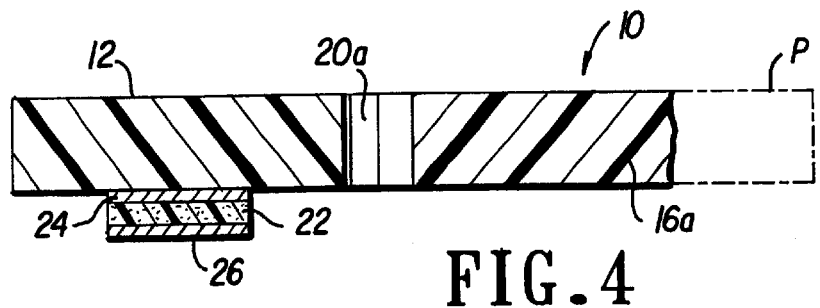
FIG. 4 is a partial cross-sectional view taken along line 4—4 in FIG. 1.

The second fingers 16a–d are also connected to the base panel member 12 but the free ends of the second fingers 16a–d extend in a second direction S which is opposite to the first direction F. The first fingers 14a–d and the second fingers 16a–d are operative to move to and between a stowed state and an extended state. In FIG. 1, the first fingers 14a, c and d and the second fingers 16a, c and d are illustrated in the stowed state while the first finger 14b and the second finger 16b are in the extended state holding the line 18. Further, in the stowed state, the first fingers 14a, c and d and the second fingers 16a, c and d are disposed in the respective openings 20. Also, the first fingers 14a, c and d and the second fingers 16a, c and d are aligned slightly offset in the longitudinal direction and generally juxtaposed to one another within the plane P. FIG. 4 illustrates by example how the fingers are disposed in the plane P in the stowed state.

Figure 5:
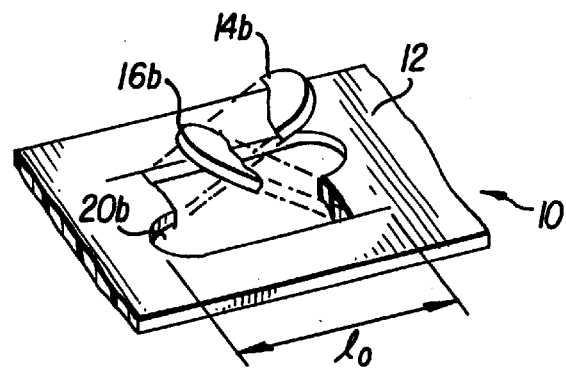
FIG. 5 is an enlarged fragmentary perspective as viewed from line 5—5 in FIG. 1.
Figure 6:
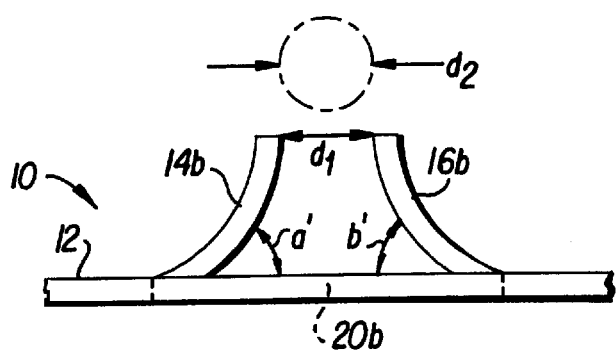
FIG. 6 is a side elevation view of a first finger and a second finger of the line holder apparatus of the invention extended in a line receiving position.
Figure 7:
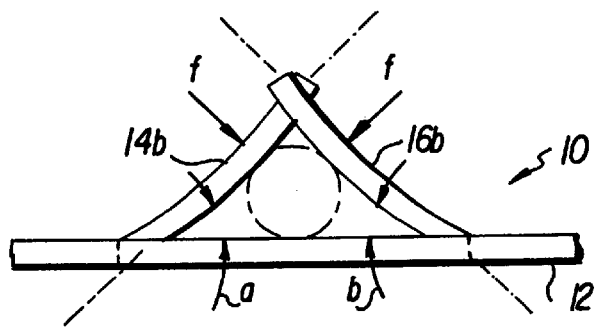
FIG. 7 is a side elevation view of the first finger and the second finger of the line holder apparatus of the invention in an extended line holding position.
Figure 8:
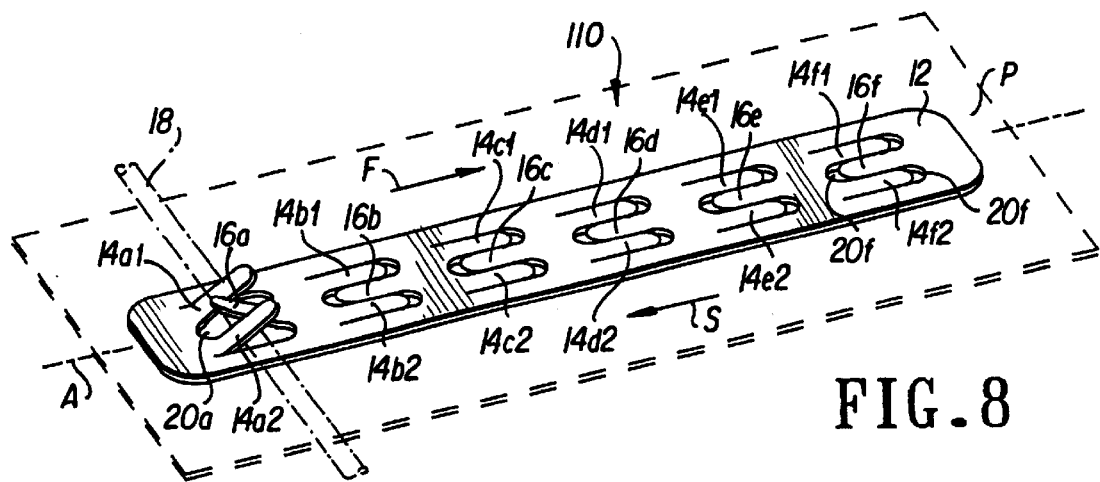
FIG. 8 is a perspective view of a second exemplary embodiment of the line holder apparatus of the invention.
Figure 9:
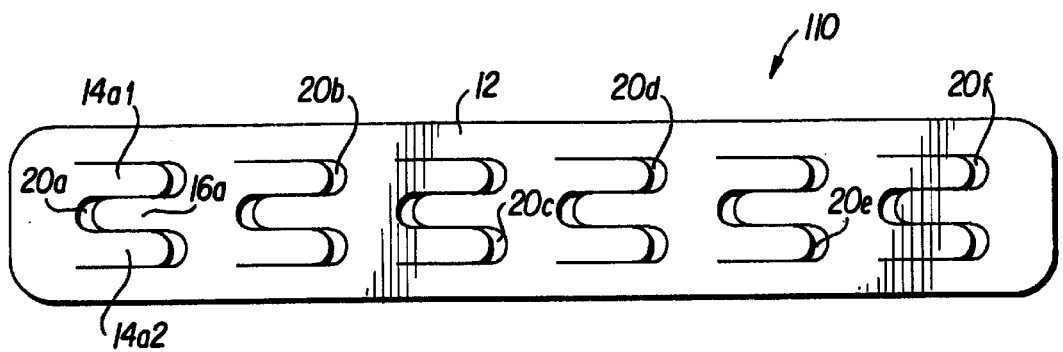
FIG. 9 is a top plan view of the line holder apparatus of the invention of FIG. 8.
Figure 10:
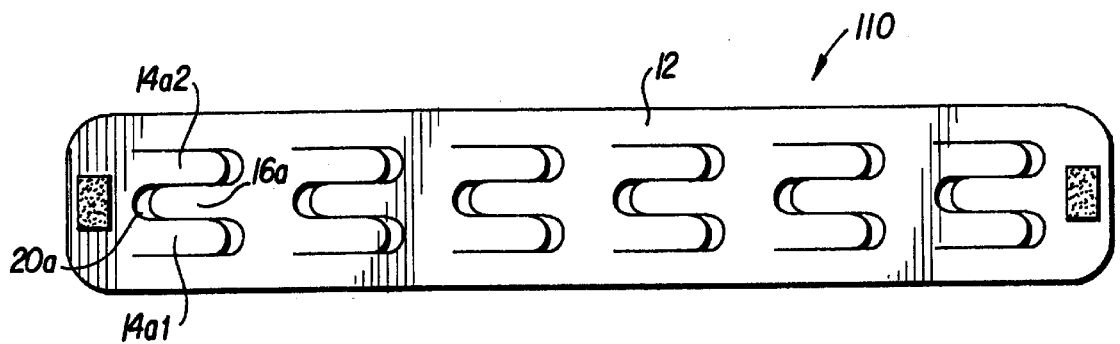
FIG. 10 is a bottom plan view of the line holder apparatus of the invention of FIG. 8.

In FIGS. 1 and 5–7, the first finger 14b and the second finger 16b are shown by way of example in the extended state. In extended state, the first finger 14b and the second finger 16b project outwardly from the opening 20 at respective acute angles a or a' and b or b' as shown in FIGS. 6 and 7.

The base panel member 12, the first fingers 14a–d and the second fingers 16a–d are fabricated from a stiff yet flexible sheet material, such as plastic. It is preferred that the sheet material is polyethylene although one of ordinary skill in the art will appreciate that other materials might be suitable. Further, by way of example only, the base panel member 12, the first fingers 14a–d and the second fingers 16a–d are a unitary construction as is preferred in the first embodiment of the line holder apparatus 10 of the invention. A preferred process for manufacturing the line holder apparatus of the invention is by die cutting, e.g., using a steel rule die or the like, a sheet material to form the base panel member periphery and fingers of the base panel member.

In the stowed state, the first fingers 14a–d and the second fingers 16a–d are relaxed or unflexed and preferably lie in the plane P of the base panel member. In the extended state, the first fingers 14a–d and the second fingers 16a–d are resiliently biased toward the stowed state. Thus, in the extended state, the first and second fingers 14a–d and 16a–d, respectively, tend to move back to the unflexed or stowed state.

As shown in FIGS. 6 and 7, the extended state has a line receiving stage (FIG. 6) and a line holding stage (FIG. 7). In the line receiving stage, the first and second fingers 14b and 16b respectively are disposed apart from one another a distance $d_1$. Correspondingly, the line 18 has a diameter $d_2$ which is less than the distance $d_1$. Thus, the distance $d_1$ is sufficient to receive the line 18 between the first and second fingers 14b and 16b respectively. After the line 18 is received, each one of the first and second fingers 14b and 16b respectively applies a holding force f to the line 18 against the base panel member 12 as shown in FIG. 7. It is appreciated that the holding force f results from the first and second fingers 14b and 16b respectively being in the extended state and being resiliently biased toward the stowed state. It is preferred that the first and second fingers 14b and 16b respectively crisscross relative to each other in the line holding stage (FIG. 7). However, in the line receiving stage (FIG. 6), the first and second fingers 14b and 16b are spaced apart from one another and are thus uncrossed relative to each other at a distance sufficient to receive the line 18.

Figure 2:
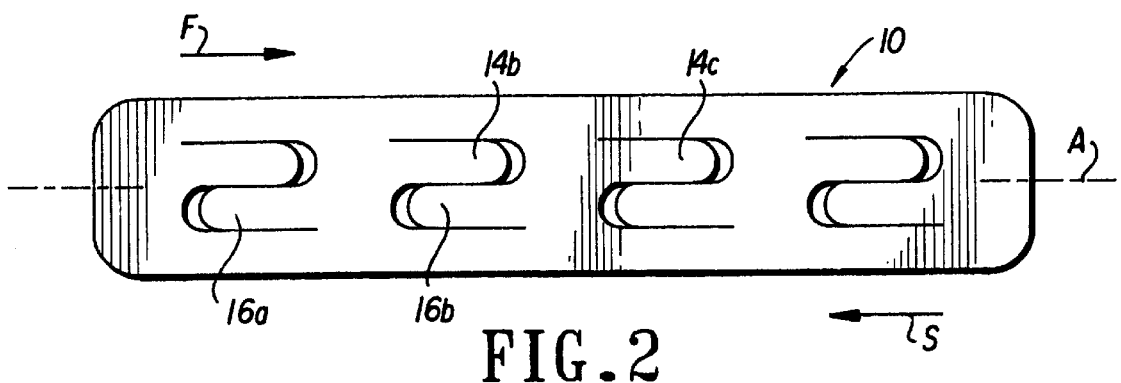
FIG. 2 is a top view of the line holder apparatus of FIG. 1.

In FIGS. 1, 2 and 4, the line holder apparatus 10 of the invention also includes a pair of fastener pads 22, which may be any suitable fastener, such as one part of a hook-and-loop material or an adhesive. Respective ones of the pads 22 are connected to the base panel member 12 at opposite end portions. However, one of ordinary skill in the art would appreciate that the line holder apparatus 10 of the invention might include only one pad 22. With reference to FIG. 4, the pad 22 is connected to the end portion of the base panel member 12 by a first adhesive 24 although the pad 22 might be connected to the base panel member 12 by other conventional means. Additionally, a second adhesive 26 may be applied to an outer surface of the pad 22 so that the line holder apparatus 10 of the invention can be permanently or temporarily adhered to a support surface, such as a bed.

In the line receiving stage, the first finger 14b projects from the base panel member 12 at the acute angle a' while, in the line holding stage, the first finger 14b projects from the base panel member 12 at the acute angle a. Correspondingly, in the line holding stage, the second finger 16b projects outwardly from the base panel member 12 at the acute angle b, and in the line receiving stage, projects at an angle b'. One of ordinary skill in the art would appreciate that the acute angle a is less than the acute angle a' and that the acute angle b is less than the acute angle b'.

Figure 3:
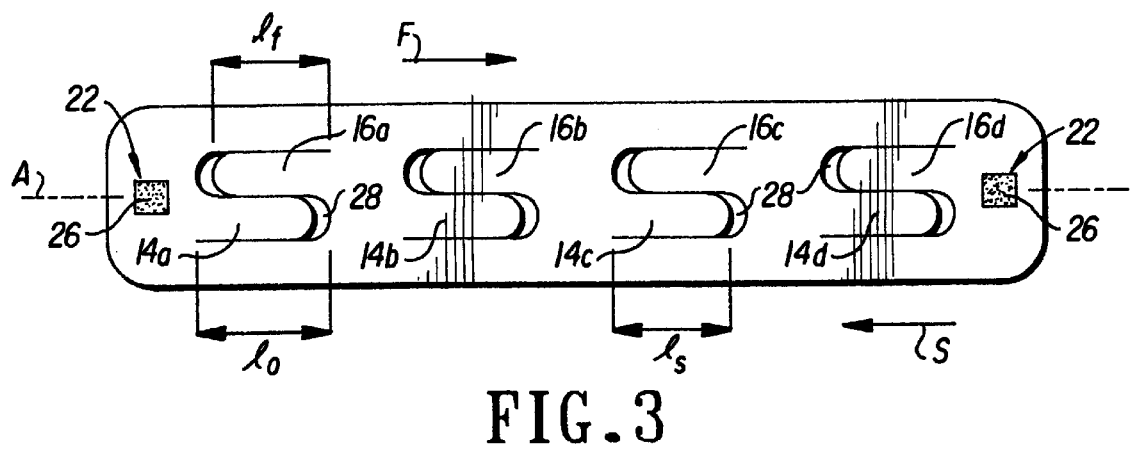
FIG. 3 is a bottom plan view of the line holder apparatus of FIG. 1.

In FIGS. 3 and 5, each one of the first fingers 14a–d has a finger length $l_f$ and each one of the second fingers 16a–d has a second finger length $l_s$. Although not by way of limitation, it is preferred that the first finger length $l_f$ is equal to the second finger length $l_s$. The opening 20 has a length $l_o$. Preferably, the opening length $l_o$ is longer than both the first finger length $l_f$ and the second finger length $l_s$. With this arrangement, each of the first and second fingers in the stowed state form holes 28 through the base panel member 12 when the first and second fingers are in the stowed state as shown in FIG. 3. Although not by way of limitation, the holes 28 are crescent shaped. It is appreciated that the line holder apparatus 10 of the present invention can be die cut to facilitate simplicity and ease of manufacturing. The holes 28 also advantageously facilitate flexing the first and second fingers to their extended positions, particularly with the user's finger or fingernail or with a slender tool or object, such as a pen or pencil point or the like.

Figure 11:
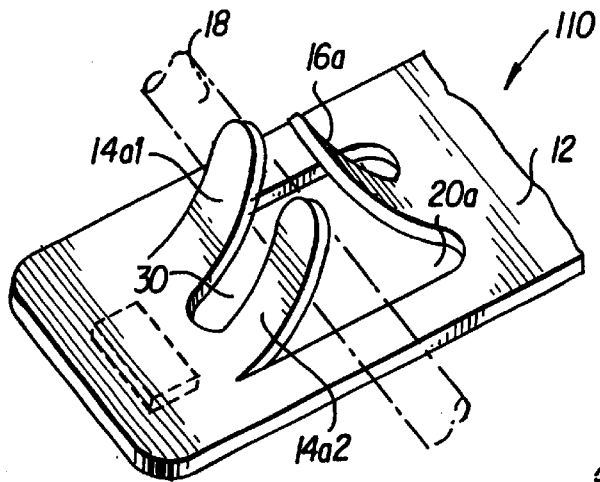
FIG. 11 is a partial perspective view of a pair of first fingers and a second finger in an extended line receiving position of the second exemplary embodiment of the line holder apparatus of the invention.
Figure 12:
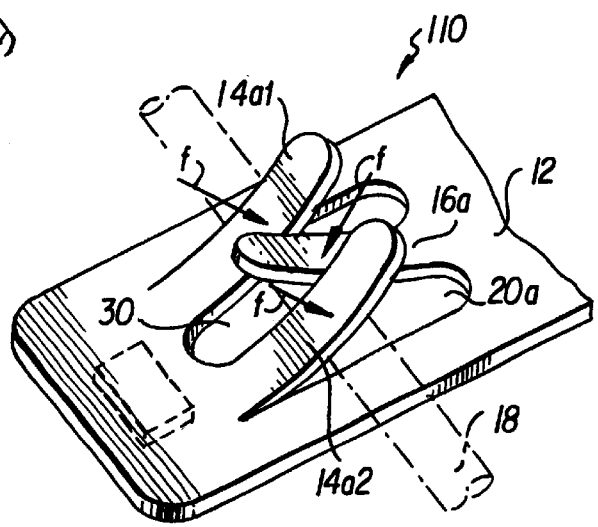
FIG. 12 is a partial perspective view of the pair of first fingers and the second finger in the extended line holding position of the second exemplary embodiment of the line holder apparatus of the invention.

A second exemplary embodiment of a line holder apparatus 110 of the present invention is illustrated in FIGS. 8–12. The second exemplary embodiment of the line holder apparatus 110 of the invention is similar to the first exemplary embodiment of the line holder apparatus 10 of the invention described above. One difference is that the line holder apparatus 110 of the invention includes a plurality of pairs of first fingers 14a1–14f2 and a plurality of second fingers 16a–f. Further, the base panel member 12 includes a plurality of openings 20a–f Respective ones of the pairs of first fingers, for example, 14a1 and 14a2, and the second finger, for example, 16a, are disposed in a respective one of the openings, in this case, 20a. Each pair of the first fingers 14a1 and 14a2 through 14f1 and 14f2 are connected to the base panel member 12 and extend in the first direction F which is parallel to the longitudinal axis A. Each individual pair of first fingers 14a1 and 14a2 through 14f1 and 14f2 are disposed laterally apart from one another forming respective spaces 30 therebetween as shown in FIGS. 11 and 12.

Respective ones of the second fingers 16a–f are also connected to the base plane member 12 and extend in the second direction S. Each one of the second fingers 16a–f is sized to have a width corresponding to the width of space 30 so as to fit in a respective one of the spaces 30. By way of example as shown in FIGS. 11 and 12, the pair of first fingers 14a1 and 14a2 and the second finger 16a are operative to move to and between the stowed state (FIGS. 9 and 10) and the extended state (FIGS. 11 and 12). By way of example, in the stowed state, the pair of first fingers 14a1 and 14a2 and the second fingers 16a are disposed within the opening 20a. Also, the pair of first fingers 14a1 and 14a2 and the second finger 16a are generally juxtaposed to one another within the plane P defined by the base panel member 12. Again, by way of example, in the extended state, each one of the pair of first fingers 14a1 and 14a2 and the second finger 16a project outwardly from the opening 20a at respective acute angles as described above. In FIG. 12, the pair of first fingers 14a1 and 14a2 and the second finger 16a, which are in the extended state, crisscross each other and are also resiliently biased toward the stowed state.

In FIG. 11, the pair of first fingers 14a1 and 14a2 and the second finger 16a are in the line receiving stage. In the line receiving stage, the second finger 16a is removed from the space 30 such that the pair of first fingers 14a1 and 14a2 together and the second finger 16a are disposed apart from one another at a distance sufficient to receive the line 18. In FIG. 12, the pair of first fingers 14a1 and 14a2 and the second finger 16a are in the line holding stage. After the line 18 is received in the line holding stage, each one of the pair of first fingers 14a1 and 14a2 and the second finger 16a applies the holding force f to the line 18 against the base panel member 12. The holding force f results because the pair of first fingers 14a1 and 14a2 and the second finger 16a are resiliently biased toward the stowed state.

Figure 13:
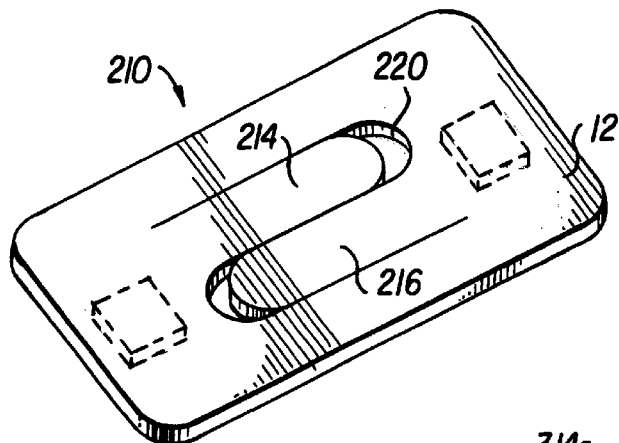
FIG. 13 is a perspective view of a third exemplary embodiment of the line holder apparatus of the invention.

A third exemplary embodiment of a line holder apparatus 210 of the invention is illustrated in FIG. 13. The line holder apparatus 210 of the invention is similar to the exemplary embodiments discussed above. One difference is that the line holder apparatus 210 of the invention includes only a single first finger 214 and a single second finger 216 disposed in a single opening 220. Operation of the first and second fingers 214, 216 to hold a line is substantially identical to the first exemplary embodiment.

Figure 14:
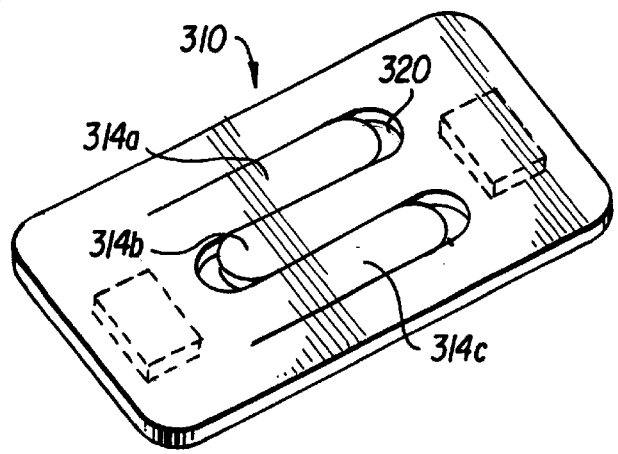
FIG. 14 is a perspective view of a fourth exemplary embodiment of the line holder apparatus of the invention.

A fourth exemplary embodiment of a line holder apparatus 310 of the invention is illustrated in FIG. 14. The line holder apparatus 30 of the invention is similar to the exemplary embodiments of the line holder apparatuses described above. However, the line holder apparatus 310 includes a single pair of first fingers 314a and 314b and a single second finger 316 disposed in a single opening 320. Operation of the first and second fingers 314a and 314b, 316 to hold a line is substantially identical to the second exemplary embodiment.

The line holder apparatus of the invention can hold one or more lines. With at least one fastener pad, the line holder apparatus of the invention can be permanently or temporarily affixed to a support structure. As particularly described by the first and second exemplary embodiments of the line holder apparatus of the invention, individual ones of multiple lines can be held by the line holder apparatus. In addition, the line holder apparatus of the invention may be configured to hold any desired number of lines in one or more rows or other desired placement of the finger arrangements of the line holder. Furthermore, the lengths of the fingers of adjacent line holders may be different so that different diameter lines may be held on the same line holder apparatus.

Although the exemplary embodiments of the invention have been specifically described herein, it would be apparent to those skilled in the art to which the invention pertains that other variations and modifications of the exemplary embodiments described herein may be made without departing from the spirit and scope of the invention.

What is claimed is:

1. A line holder apparatus for holding a line, comprising:
   a base panel member extending along and laterally from a longitudinal axis to define a plane and having an opening extending therethrough;

a first finger connected to the base panel member and extending in a first direction parallel to the longitudinal axis; and a second finger connected to the base panel member and extending in a second direction opposite the first direction whereby the first and second fingers are operative to move to and between a stowed state whereby the first and second fingers are disposed in the opening and generally juxtaposed to one another within the plane and an extended state whereby each one of the first and second fingers projects outwardly from the opening at an acute angle relative to the base panel member; and a line held in a secure position by said first and second fingers in the extended state.

2. A line holder apparatus according to claim 1, wherein the first and second fingers in the extended state crisscross relative to each other.

3. A line holder apparatus according to claim 1, wherein the first and second fingers in the extended state are resiliently biased toward the stowed state.

4. A line holder apparatus according to claim 1, wherein the base panel member, the first finger and the second finger are a unitary construction.

5. A line holder apparatus according to claim 4, wherein the base panel member, the first finger and the second finger are fabricated from a stiff yet flexible sheet material.

6. A line holder apparatus according to claim 5, wherein the sheet material is plastic.

7. A line holder apparatus according to claim 6, wherein the sheet material is polyethylene.

8. A line holder apparatus according to claim 1, further comprising a plurality of first and second fingers with the base panel member including a plurality of openings, whereby respective ones of the first and second fingers are disposed in a respective one of the openings and generally juxtaposed to one another in the plane when in the stowed state and project from the respective ones of the openings at acute angles relative to the base panel member when in the extended state.

9. A line holder apparatus according to claim 1, further comprising a fastener pad connected to the base panel member for affixing the base panel member to a support structure.

10. A line holder apparatus, comprising:

a base panel member extending along and laterally from a longitudinal axis to define a plane and having an opening extending therethrough;

a pair of first fingers connected to the base panel member and extending in a first direction parallel to the longitudinal axis, the pair of first fingers disposed laterally apart from one another forming a space therebetween; and a second finger connected to the base panel member and extending in a second direction opposite the first direction, the second finger sized for receipt within the space whereby the pair of first fingers and the second finger are operative to move to and between a stowed state whereby the pair of first fingers and second finger are disposed in the opening and generally juxtaposed to one another within the plane and an extended state whereby each one of the pair of first fingers and the second finger project outwardly from the opening at an acute angle relative to the base panel member.

11. A line holder apparatus according to claim 10, wherein the pair of first fingers and the second finger in the extended state crisscross each other.

12. A line holder apparatus according to claim 11, wherein the pair of first fingers and the second finger in the extended state are resiliently biased toward the stowed state.

13. A line holder apparatus according to claim 10, further comprising a plurality of pairs of first fingers and a plurality of second fingers with the base panel member including a plurality of openings, whereby respective ones of the pairs of first fingers and the second fingers are disposed in a respective one of the openings and generally juxtaposed to one another within the plane when in the stowed state and project from the respective ones of the openings at respective acute angles relative to the base panel member when in the extended state.

14. A line holder apparatus according to claim 10, wherein the base panel member, the pair of first fingers and the second finger are a unitary construction.

15. A line holder apparatus for holding a line, comprising:

a base panel member extending along and laterally from a longitudinal axis to define a plane and having an opening extending therethrough;

a first finger connected to the base panel member and extending in a first direction parallel to the longitudinal axis; and a second finger connected to the base panel member and extending in a second direction opposite the first direction whereby the first and second fingers are operative to move to and between a stowed state whereby the first and second fingers are disposed in the opening and generally juxtaposed to one another within the plane and an extended state wherein each one of the first and second fingers projects outwardly from the opening at an acute angle relative to the base panel member, the extended state having a line receiving stage whereby the first and second fingers are disposed apart from one another a distance sufficient to receive the line therebetween and a line holding stage whereby, after the line is received, each one of the first and second fingers applies a holding force to the line against the base panel member as a result of the first and second fingers being resiliently biased toward the stowed state.

16. A line holder apparatus according to claim 14, wherein in the line holding stage, the first and second fingers crisscross relative to each other and, in the line receiving stage, the first and second fingers are uncrossed relative to each other.

17. A line holder apparatus for holding a line, comprising:

a base panel member extending along and laterally from a longitudinal axis to define a plane and having an opening extending therethrough;

a pair of first fingers connected to the base panel member and extending in a first direction parallel to the longitudinal axis, the pair of fingers disposed laterally apart from one another forming a space therebetween; and a second finger connected to the base panel member and extending in a second direction opposite the first direction, the second finger sized to be received within the space whereby the pair of first fingers and second finger are operative to move to and between a stowed state whereby the pair of first fingers and second finger are disposed in the opening and generally juxtaposed to one another within the plane and an extended state whereby each one of the pair of first fingers and the second finger project outwardly from the opening at an acute angle relative to the base panel member, the extended state having a line receiving stage whereby the second finger is removed from the space such that the pair of first fingers together and the second finger are disposed apart from one another a distance sufficient to receive the line and a line holding stage whereby, after the line is received, each one of the first and second fingers applies a holding force to the line against the base panel member as a result of the pair of the first fingers and the second finger being resiliently biased toward the stowed state.

18. A line holder apparatus for holding a line according to claim 15, wherein each one of the first and second fingers has a finger length and the opening has an opening length, the opening length being longer than the finger length thereby forming holes through the base panel member when the first and second fingers are in the stowed state.

19. A line holder apparatus for holding a line according to claim 18, wherein each one of the pair of first and second fingers has a finger length and the opening has an opening length, the opening length being longer than the finger length thereby forming holes through the base panel member when the first and second fingers are in the stowed state.

* * * * *